L. A. NORVIEL & J. T. COMPTON.
LAND LEVELING AND CHECKING APPARATUS.
APPLICATION FILED JAN. 29, 1912.
1,044,414.
Patented Nov. 12, 1912.
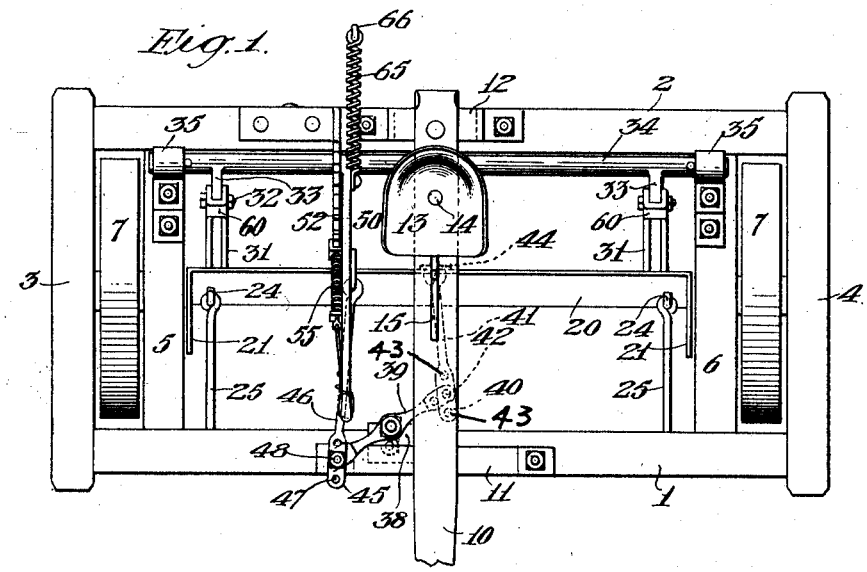
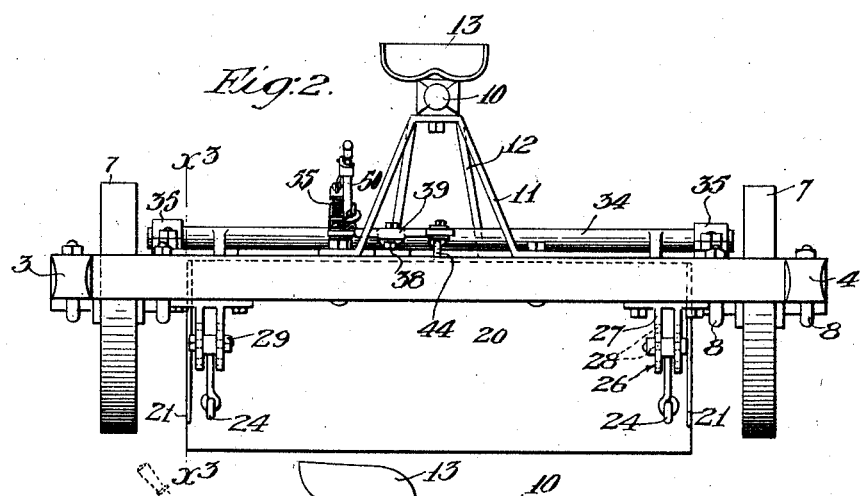
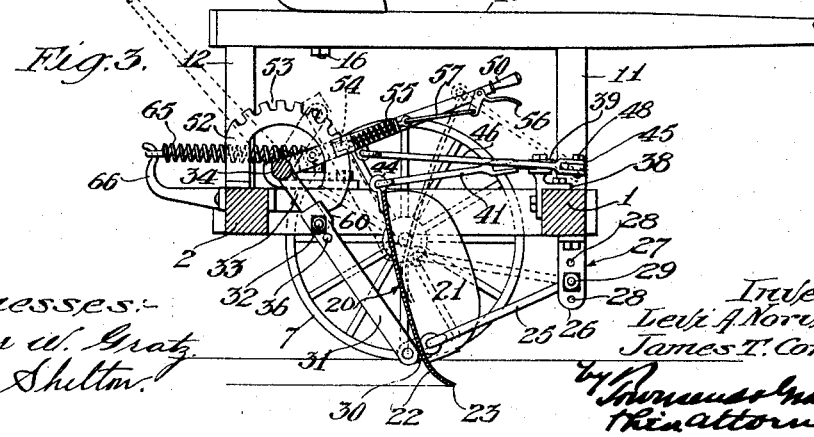

UNITED STATES PATENT OFFICE.

LEVI A. NORVIEL AND JAMES T. COMPTON, OF PIXLEY, CALIFORNIA.

LAND LEVELING AND CHECKING APPARATUS.

1,044,414. Specification of Letters Patent. Patented Nov. 12, 1912.

Application filed January 29, 1912. Serial No. 674,190.

*To all whom it may concern:*

Be it known that we, LEVI A. NORVIEL and JAMES T. COMPTON, both citizens of the United States, residing at Pixley, in the county of Tulare and State of California, have invented a new and useful Land Leveling and Checking Apparatus, of which the following is a specification.

Our invention relates to an apparatus adapted to be drawn over the ground by any suitable motive power for the purpose of leveling the surface of the ground by cutting down the high portions of the surface and depositing the portions so removed in the hollows or depressions in the ground's surface, or the device may be used for forming checks or embankments when it is desired to form retaining means for water during irrigation of the ground, and one of the main objects of our invention is to produce an apparatus of the character described of simple form and construction, the scraping or cutting blade of which may be operated in a simple manner with the expenditure of a minimum amount of exertion on the part of the operator.

Another object of our invention is to produce an apparatus of the character described in which the scraping blade is supported adjacent the cutting edge thereof and held substantially rigid in the desired position.

Other objects and advantages will appear hereinafter from the following specification.

Referring to the drawings, which are for illustrative purposes only: Figure 1 is a plan view of an apparatus embodying a form of our invention. Fig. 2 is a front elevation of the apparatus shown in Fig. 1. Fig. 3 is a vertical, sectional view taken on line $x^3$—$x^3$ Fig. 2.

The apparatus comprises a main frame consisting of front and rear longitudinal members 1 and 2 respectively connected at each end by end bars or members 3 and 4. Spaced apart from each end bar 3 and 4 are cross bars 5 and 6 which are secured at each end to the members 1 and 2, the spaces between the bars 3 and 5 and the bars 4 and 6 being each adapted to receive supporting wheels 7 mounted in suitable bearings 8 secured to the underside of the respective bars 3, 5, 4 and 6.

The apparatus in the form shown is adapted to be drawn by a team of horses, a suitable pole 10 being supported on the frame of the device by means of standards 11 and 12, the standard 11 being secured to the member 1 and the standard 12 being supported on the member 2. A suitable seat 13 for the driver is slidably mounted on the pole 10 by means of a bolt 14 which extends through a slot 15 formed in the pole and is clamped in adjusted position on the pole by means of a nut 16 which engages the lower end of the bolt 14 and bears against the lower side of the pole. The seat 13 being slidably movable on the pole, as above described, permits the seat to be adjusted in a correct position so that the weight of the driver balances the apparatus.

20 designates a scraping blade which extends longitudinally in the frame of the apparatus between the cross bars 5 and 6, each end of the blade 20 being turned forwardly to form end members 21 which prevent the soil from falling off the blade at each end thereof. The lower portion of the blade is curved forwardly, as indicated at 22, for the purpose of bringing the cutting edge 23 of the blade more directly in line with the line of support of the blade and also serving as a means for allowing the dirt to pile up on the blade when it is desired to cut a considerable quantity of dirt from the surface of the ground.

The blade 20 is supported in the following manner. Secured at each end of the blade in any suitable manner is an eye 24 which projects forwardly from the blade 20. Pivotally connected to each eye 24 is a link 25, the forward end of which is supported between the downwardly extending legs 26 of a bracket 27. The legs of the brackets are each provided with a series of perforations 28 which are adapted to receive a bolt 29 which extends therethrough and through an eye formed in the forward end of each link 25.

The series of perforations 28 permits an adjustment of the forward ends of the links 25 so as to permit a variation in the throw of the blade 20. Secured to the rear side of the blade, adjacent each end thereof, is a lug 30 upon which is pivotally mounted a slotted supporting link 31, the upper end of which is pivotally connected by means of a pin 32 to the end of a rock arm 33 formed as a part of or secured to a rock shaft 34, which shaft 34 is supported at each end in suitable bearings 35 mounted on the cross bars 5 and 6 of the frame of the apparatus. The upper end of each supporting link 31 is provided with a series of perforations 36 so that the position of the pin 32 may be changed to afford an adjustment between the rock arm and its associated supporting link.

The position of the blade 20 is controlled by the following mechanism. Pivotally mounted intermediate its length to a bracket 38 supported on the member 1 is a lever 39, one end of which extends into a clevis 40 formed on the forward end of a link 41 and is pivotally secured thereto by means of a suitable pin 42 which extends through perforations 43 formed in the clevis 40, a series of such perforations being formed in the clevis so that the forward end of the link 41 may be adjusted with relation to the clevis. The rear end of the link 41 is pivotally connected to an eye 44 extending upwardly from the upper edge of the blade 20 and secured thereto in any suitable manner.

The opposite end of the lever 39 extends into a clevis 45 formed on the end of a link 46 and is pivotally connected to any of a series of perforations 47 therein by means of a pin 48. The rear end of the link 46 is pivotally connected to an operating lever 50, which operating lever 50 is secured at its lower end to the rock shaft 34.

A quadrant 52 is mounted on the member 2 of the frame and is provided with a series of notches 53 adapted to receive the end of a latch bolt 54 slidably mounted on the lever 50, which bolt 54 is held in engagement with the respective notches 53 by means of a coiled spring 55 in the ordinary manner.

A suitable hand grip 56 is pivoted to the lever 50 and connected by means of a link 57 to the latch bolt so that the bolt 54 may be disengaged from the notches in the quadrant and the position of the lever 50 changed for the purposes hereinafter described. The upper end of each supporting link 31 is formed with an extension 60 which engages the upper face of the rock arm 33 when the blade 20 is in lowered position, thereby preventing a flexing action between the link 31 and arm 33 so that the link 31 and arm 33 form a rigid member between the rock shaft 34 and the lower or cutting edge of the blade 20.

It is to be noted that the cutting blade 20 is hung on the frame between the supporting wheels 7 and that the cutting edge of the blade enters the ground approximately directly below the axial line of the wheels and that the extent of penetration of the edge 23 of the blade into the ground is according to the distance that the edge 23 of the blade extends below the wheels.

It is understood that where the apparatus is drawn by a team of horses, as hereinbefore referred to, the pulling strain is directly applied to the supporting member for the links 25 which transmit the strain directly to the lower edge of the cutting blade.

The apparatus is operated in the following manner: The latch bolt 54 is released from the quadrant 52 by means of the hand grip 56, after which the lever 50 is thrown from the dotted position to the full line position shown in Fig. 3. The movement of the lever, just described, throws the upper edge of the blade 20 rearwardly through the medium of link 46, lever 39 and link 41, which movement causes the cutting edge 23 of the blade to be swung forwardly and downwardly with a pivotal movement about the pin 26 by means of link 25. The rocking of the shaft by means of the lever 50 also causes the arm 33 to swing downwardly until the upper face of the arm is engaged by the bridge 60 on the link 31, as above described, thereby forming a rigid support or brace for the blade in alinement with the thrust or cutting edge of the blade. The blade when so adjusted cuts off a portion of the surface of the ground and drags the dirt so removed on the blade until depressions in the ground are encountered at which time the dirt falls from the blade into such depressions.

It is also understood that the position of the lever 50 may be changed to vary the depth of the cut of the blade 20. When it is desired to adjust the blade so that the upper edge of the blade tilts a considerable distance rearwardly and downwardly to afford a greater carrying capacity of the blade, such as is desirable when the apparatus is used for checking, the position of the lever 39 with the respective links 41 and 46 is changed by moving the pins 42 and 48 into the proper perforations in the respective clevises 40 and 45. If it is desired, a coil spring 65 may be secured to the operating lever at one end and to a bracket 66 at the other end, which bracket 66 is mounted on the member 2 of the frame. The spring 65 when connected as above described places a tension on the operating lever 50 to draw the same rearwardly, thereby equalizing the weight of the blade so that the driver is relieved of lifting the whole weight of the blade and the parts connected thereto when it is desired to raise the blade.

What we claim is:—

1. A land leveling and checking apparatus comprising a frame, wheels for supporting said frame, a cutting blade in said frame between said wheels, a pair of links pivotally mounted on said frame, each having one end thereof connected to the front of said blade adjacent the lower edge thereof, a pair of slotted links connected to the rear of said blade adjacent the lower edge thereof, a shaft mounted on said frame, a pair of rock arms secured to said shaft, means for connecting each rock arm to one of said slotted links, a bridge on said slotted links adapted to engage the upper face of said rock arms, an operating lever on said shaft, and means connected to the upper portion of said blade and said operating lever to vary the position of said blade to raise and lower the cutting edge thereof.

2. A land leveling and checking apparatus comprising a frame, wheels for supporting said frame, a cutting blade in said frame between said wheels, a pair of links pivotally mounted on said frame, each having one end thereof connected to the front of said blade adjacent the lower edge thereof, a pair of slotted links connected to the rear of said blade adjacent the lower edge thereof, a shaft mounted on said frame, a pair of rock arms secured to said shaft, means for connecting each rock arm to one of said slotted links, a bridge on said slotted links adapted to engage the upper face of said rock arms, an operating lever on said shaft, a lever pivotally mounted on said frame, a link connecting one end of said lever to the upper portion of said blade, a link connecting the opposite end of said lever to said operating lever, and means for retaining said operating lever in fixed relation to said frame, and means for releasing said retaining means.

In testimony whereof, we have hereunto set our hands at Los Angeles, California, this 10th day of January, 1912.

LEVI A. NORVIEL.
JAMES T. COMPTON.

In presence of—
ISABEL HALL,
P. H. SHELTON.

---

Copies of this patent may be obtained for five cents each, by addressing the "Commissioner of Patents. Washington, D. C."